United States Patent

[11] 3,615,960

[72] Inventors Kiyoshi Hoshii
Ichikawa-shi;
Hisao Ishikawa, Tokyo; Keishi Tado,
Ichikawa-shi, all of Japan
[21] Appl. No. 708,317
[22] Filed Feb. 26, 1968
[45] Patented Oct. 26, 1971
[73] Assignee The Fujikura Cable Works Limited
Tokyo, Japan
[32] Priorities Feb. 28, 1967, June 3, 1967
Japan
42/12255, 42/35160

[54] BONDING USING EPOXY RESIN COMPOSITION AND NONACTIVATED BLOWING AGENT
15 Claims, 1 Drawing Fig.
[52] U.S. Cl. .................................................. 156/49,
156/52, 156/79, 156/91, 156/158, 156/296,
156/344, 285/21, 225/93.5, 241/1
[51] Int. Cl. ....................................................... H02g 1/14
[50] Field of Search .......................................... 156/330,
344, 49, 152, 52, 79, 91, 158, 296, 77; 264/317;
241/1; 161/184; 225/93.5; 117/2; 285/21; 260/2.5
EP

[56] References Cited
UNITED STATES PATENTS

| | | | |
|---|---|---|---|
| 2,956,037 | 10/1960 | Venable ..................... | 260/30.6 |
| 3,127,291 | 5/1964 | Betz et al. ................. | 156/49 |
| 3,348,640 | 10/1967 | Thompson et al. ........ | 188/250 |
| 3,406,131 | 10/1968 | Kuhlkamp et al. ........ | 260/2.5 |
| 3,429,838 | 2/1969 | Hersh ...................... | 260/2.5 |
| 3,454,506 | 7/1969 | Brack ....................... | 260/2.5 |
| 3,471,350 | 10/1969 | O'Berry et al. ........... | 156/184 |

FOREIGN PATENTS

| | | | |
|---|---|---|---|
| 1,081,350 | 8/1967 | Great Britain .............. | 156/49 |

*Primary Examiner*—Carl D. Quarforth
*Assistant Examiner*—E. A. Miller
*Attorney*—Wenderoth, Lind & Ponack

ABSTRACT: Epoxy resin composition consisting essentially of an epoxy resin component, curing agent, thermally decomposable blowing agent and optionally thermoplastic polymer, said composition, after curing, being capable of being broken up by expanding with the application of heat. It is used, for example, in joining cables by connecting core wires, slipping sleeve over portion where core wires have been connected, sealing said sleeve and sheath by said epoxy composition and thereafter curing said epoxy composition to form sealed portion, said sealed portion being capable of subsequent dismantlement.

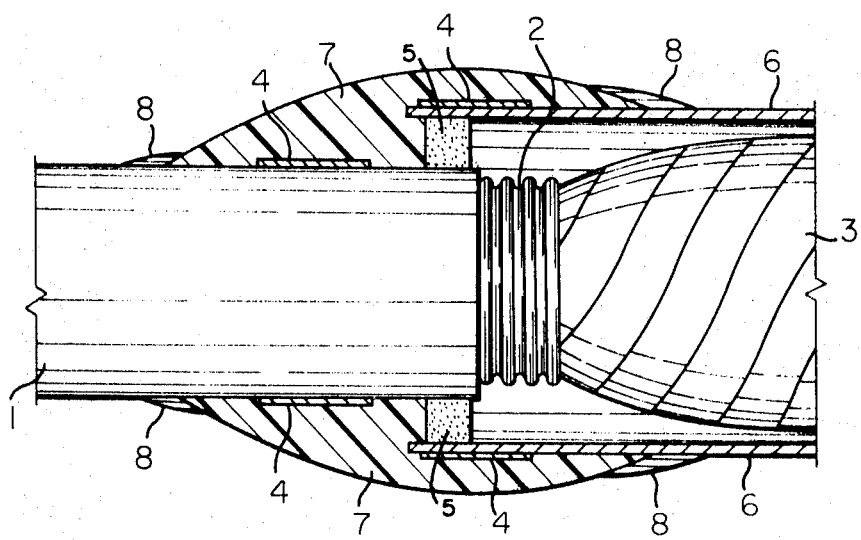
KIYOSHI HOSHII,
HISAO ISHIKAWA and
KEISHI TADO,
INVENTORS
BY Wenderoth, Lind & Ponack.
ATTORNEYS

BONDING USING EPOXY RESIN COMPOSITION AND NONACTIVATED BLOWING AGENT

This invention relates to an epoxy resin composition and, in particular, to a new epoxy resin composition which is capable of stopping the spaces of structures or can adhere aggregates but, on the other hand, can, after application, be broken up and removed by expanding with the application of neat.

The epoxy resins are used for the adhesion of a wide variety of articles because they firmly adhere to the surface of the material in contact therewith when curing without giving off any volatile substances in so doing, and furthermore because of their excellent mechanical strength and electrical insulating property. Thus, the known epoxy resin compositions are satisfactory for such purpose as the permanent adhesion of structures or aggregates. However, with respect to such uses as the temporary stopping of spaces of structures or the temporary stopping of spaces of structures or the temporary adhesion of aggregates they were not entirely satisfactory.

For example, the conventional epoxy resins are used as putty for securing window glass to sashes on account of their superior adhesion and sealing effects when used with structures. However, when a once packed putty is to be removed for replacing the windowpane, difficulty is frequently encountered in removing the putty because the adhesiveness and mechanical strength of the epoxy resins are too great.

On the other hand, while the known putty materials other than the epoxy resins can be removed relatively easily after having been used for stopping the spaces of structures, they had the drawback that their adhesiveness to the structure and sealing effect were very poor.

Again, in sealing electric cables or wires such as power and communications cables, a method is quite prevalent which comprises first joining the core wires, slipping a sleeve over the core wire joint and then sealing the sleeve and the sheath of the electric wires or cables. Lately, a proposal is being made of using the epoxy resins as the sealing agent in this case. However, when the need arises of dismantling the sealed portion for the purpose of providing a new branch in a once joined electric wire or cable or of inspecting the cable there is the drawback that the breaking up and removal of the once packed and cured epoxy resin is very difficult due to its great toughness.

It is therefore an object of the invention to provide a new epoxy resin composition which can achieve a tight seal by its strong adhesion to the surface of the material in contact therewith when packed in the spaces of structures or applied to the surroundings of the boundaries of aggregates but, on the other, can be readily broken up and removed by means of heat after its application.

Another object of the invention is to provide a new epoxy resin composition which is capable of being cured while latently possessing the property of being expanded by heating and, in addition, does not suffer by comparison with the conventional epoxy resin compositions with respect to adhesiveness, mechanical properties and electrical insulating property and yet possesses the hereinbefore noted property.

Other objects and advantages of the invention will become apparent from the following description. It was found that these objects could be achieved by an epoxy resin composition which is curable while latently possessing the property of being expandable by heating, and specifically by an epoxy resin composition comprising an epoxy resin component, a curing agent and a thermally decomposable blowing agent, as its requisite constituents.

Namely, since the epoxy resin composition of this invention comprises an epoxy resin component and a curing agent to which has been further incorporated a thermally decomposable blowing agent, it can be cured at ambient temperature as in the case with the conventional epoxy resin compositions which contain a curing agent but, on the other hand, the cured resin composition expands readily by heating to result in numerous cracks being formed therein, with the consequence that it becomes possible to easily remove the cured resin composition from its place of application with relatively small effort.

As the epoxy resin component to be used in the invention, any compound or high molecular compound having two or more epoxy groups in its molecule can be used. However, it is preferred that as this epoxy resin component use is made of principally the condensation product of epichlorohydrin and a polyhydric phenol and/or a polyhydric alcohol and, in particular, a bis-epoxy compound of the formula

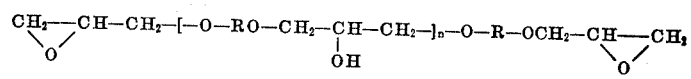

wherein R is a bivalent hydrocarbon group, preferably a residue resulting after removing two hydroxyl groups from polyvalent phenols or aromatic polyhydric alcohols, and $n$ is a number from 0 to 8, and preferably from 0 to 2. The bisphenol such as 2,2-bis(4'-oxyphenyl) propane or the bis-epoxy compounds obtained from epichlorohydrin and such polyhydric alcohols as resol are particularly suitable for use as the epoxy resin component of this invention in view of their ready availability.

While the bis-epoxy compounds of the foregoing general formula exhibit varied properties ranging from those which are liquids of low viscosity to high viscosity or are of a pasty form depending upon the class of the bivalent group R and the value $n$ all forms can be used in the invention. The term "epoxy resin component," as herein used, is meant to include all of the these epoxy compounds.

On the other hand, the curing agent which can be used in the invention includes those difunctional compounds which are capable of readily reacting with the epoxy and/or hydroxyl group. These curing agents are those low molecular or high molecular compounds which are known per se. Usable, for example, are diamines or polyamines having active hydrogen, dimercaptans, carboxylic acid amides, polyamides, polysulfides or sulfonic acid amides, or the mixtures of these compounds. Further, usable are the commercially available curing agents having these compounds as their principal ingredient.

It is preferred that the curing agent to be used in the invention is one which can cure the epoxy resin component in a relatively short period of time at a temperature lower than the decomposition temperature of the hereinafter described blowing agent, and particularly at ambient temperature. For this reason the use of diamines, polyamines or the relatively low molecular weight polyamide resins or polysulfides is especially recommended. Needless to say, the foregoing curing agents can be used in combination in accordance with the known prescriptions. For example, the curing speed of the epoxy resin component can be controlled by using a low molecular weight amine and a high molecular weight polyamide in combination.

The ratio in which the epoxy resin component and the curing agent are mixed may be that usually used heretofore in curing the epoxy resins. While the proportion in which the two components are mixed will vary considerably depending, for example, on the class of the two components to be used, generally speaking, a proportion in which the curing agent is contained in the amount of 5 to 100 parts by weight per 100 parts by weight of the epoxy resin component is to be preferred from the standpoint of the curing operation but, on the other hand, a proportion in which the curing agent ranges from 30 to 60 parts by weight per 100 parts by weight of the epoxy resin component is to be desired from the standpoint of the blending operation.

The blowing agent used in the invention is of the type which does not decomposes during the curing of the epoxy resin component but remains in the resin composition to decompose upon being heated and evolve a gas.

As such a blowing agent, usable are the well-known solid blowing agents which are used in the production of the foamed structures of rubber or the vinyl chloride resins. For example, usably are such organic blowing agents as azoisobutyronitrile, dinitrosopentamethylenetetramine, azodicarbamic acid amide, benzenesulfonylhydrazide and its derivatives, p,p'-oxybis (benzenesulfonylhydrazide) and its derivatives and N,N'- dinitroso N,N'dimethylterephthalamide.

Generally speaking, the curing of the epoxy resins is accompanied by the generation of heat. Hence, for ensuring that the blowing agent does not decompose by this heat it is particularly desirable that the blowing agent chosen from among the foregoing blowing agents is one which has a decomposition temperature in the range of 90° to 200° C. However, if the curing agent used is so chosen that the curing speed of the resin composition is retarded or the amount used of the curing agent is in such a small amount that sufficient cooling of the resin composition takes place during its curing, it also becomes possible to use a blowing agent whose decomposition temperature is relatively low.

It goes without saying that when the decomposition temperature of the blowing agent used is high it can also be used suitably combined with an acid blowing promotor such as oxalic acid or a urea type promotor.

While the amount of the blowing agent to be incorporated in the resin composition in the invention varies considerably depending upon the kind of the blowing agent used, it is generally desirable to use 10 to 50 parts by weight, and preferably 15 to 25 parts by weight, of it per 100 parts by weight of the epoxy resin component. When the blowing agent is used in an amount less than 10 parts by weight per 100 parts by weight of the epoxy resin component, it is curable to obtain the desired expanding effect when it is intended to break up the cured resin composition, whereas the use of the blowing agent in the amount exceeding 50 parts by weight not only is a disadvantage economically but there are cases in which the resin composition does not cure depending upon the kind of the blowing agent used.

It was also found according to the invention that by further incorporating a thermoplastic resin in the composition comprising an epoxy resin component, a curing agent and a thermally decomposable blowing agent, the breaking up and removal of the cured resin composition from the place where it was applied could be made still easier.

Namely, in the case of a composition comprising an epoxy resin component, a curing agent and a thermally decomposable blowing agent there is the tendency that the gas formed by the decomposition of the blowing agent by heating to escape somewhat from the cured resin composition, but when a thermoplastic resin is incorporated this escape of the gas resulting from decomposition of the cured resin composition can be prevented. In addition, the cured epoxy resin can be imparted still more completely the latent property by which it is capable of expanding or forming cracks by means of heat, with the consequence that the breaking up of the cured resin composition becomes still more easy.

In view of the hereinabove described actions, the thermoplastic polymer which can be used is preferably one having a softening temperature which either coincides with or is lower than the decomposition temperature of the thermally decomposable blowing agent. Hence, the thermoplastic polymers which can be used in the invention are those chosen from the polymers or copolymers of the alpha, beta unsaturated compounds, such as polystyrene, methyl polyacrylate, polymethyl methacrylate, polyvinyl acetate, polyethylene, polypropylene, ethylene-vinyl acetate copolymer, vinyl acetate-vinyl chloride copolymer, ethylene-ethyl acrylate copolymer, ethylene-propylene rubber, butyl rubber and natural rubber. Of these high molecular compounds, those polymers and copolymers whose melting point is relatively low are suitably for use as the thermoplastic polymer in the invention.

The thermoplastic polymer can be incorporated in the epoxy resin composition as a coarse or fine powder, or in a fibrous state, or as a liquid. The amount of the thermoplastic polymer incorporated in this case is preferably in a range of 3 to 30 parts by weight per 100 parts by weight of the epoxy resin component. When the thermoplastic polymer is incorporated in the amount in excess of 30 parts by weight, there is a tendency to a decline in the adhesiveness as well as the sealing effect of the epoxy resin composition. On the other hand, when the amount used of said polymer is less than 3 parts by weight, the effect of the incorporation of the thermoplastic polymer is not pronounced.

In the case of the epoxy resin composition which has been thus incorporated a thermoplastic polymer, the breaking up of the cured resin composition is made much easier. When a strong adhesiveness and sealing effect of great mechanical strength is desired in the cured resin composition, the previously described epoxy resin composition not incorporated with the thermoplastic resin is used.

Besides the aforesaid essential constituents, the invention epoxy resin composition can be incorporated with such other additives as fillers, colorants and dispersing agents, if desired.

As such fillers, usable are substances such as finely divided silica, powdered or fibrous glass, light and heavy calcium carbonate, calcium carbonate surface-treated with aliphatic acid salts, talc, calcined clay, rock wool, asbestos, diatomaceous earth and zinc white, or such as carbon black in those cases where the epoxy resin composition is to be used for other than insulating purposes. Since these fillers are not only useful for imparting bulk to the resin composition but can also provide the uncured resin composition with form retaining property, it is generally preferable to incorporate them in an amount of 50 to 500 parts by weight per 100 parts by weight of the epoxy resin component.

Further, metallic powders of such as aluminum or metal oxides such as ferric oxide ($Fe_2O_3$) may be suitably incorporated in the invention epoxy resin composition for improving its adhesiveness to the surface of structures with which it contacts, as well as improving its thermal dissipation during curing or its thermal conductivity during its break up by heating.

Before its application the invention epoxy resin composition should preferably be in either a pasty, semisolid or plastic solid state in order that it can be applied conveniently. It is generally recommended that the composition be such that the degree of needle penetration of the plastic blend is at least 20 but not greater than 200.

When the composition is one in which the degree of needle penetration is relatively low in the foregoing range, it is preferred that in its application it be heated to a temperature below that at which the blowing agent decomposes. On the other hand, when the composition is to be applied without heating, it is preferred that the degree of needle penetration is in the range from 40 to 120.

The invention epoxy resin composition can be prepared by blending and kneading together the several constituents before its use. However, since it is difficult for the common user to blend the numerous constituents uniformly and in a short period at the working place, it is preferred that, as in the case with the conventional two-liquid system epoxy adhesive, it be prepared separately in two systems of one that contains the curing agent and one that contains the epoxy resin component and that the two systems be mixed at the to and that the two systems be mixed at working place when it is to be used.

In preparing the two systems, it is preferred for ensuring that the mixing can be carried out uniformly that the curing of each system, i.e., the needle penetration, be made of the same degree.

In accordance with JIS K-2530-1960 the degree of needle penetration is defined to specify the burning of a sample by a length by which a prescribed needle penetrates the sample under the prescribed conditions of temperature, load and time. When the needle penetrates the sample by 0.1 mm., the value of the degree of needle penetration is defined as 1. The normal needle of a needle penetration meter is prepared by polishing one end of a round steel rod having a diameter of 1.00–1.02 mm. and a length of about 50.8 mm. into a cone having a height of about 6.35 mm. and an angle of 8°40′–9°40′, cutting off the end at a position where the diameter is between 0.14 mm. and 0.16 mm., tempering the rod, polishing it sufficiently, and fitting it to the central axis of a brass handle having a length of about 32 mm. of the needle penetration meter. The normal conditions under which the values of the degree of needle penetration are measured are a temperature of 25° C., load of 100 g. (the total weight of the needle, the brass handle and a poise) and time of 5 seconds.

The blowing agent is preferably incorporated in the curing composition, for prolonging the storage life of the epoxy resin composition before its use. On the other hand, the thermoplastic polymer is preferably incorporated in the system containing the epoxy resin component.

A suitable illustration of the recipes of the two systems are shown below.

Epoxy resin component-containing system.

|  | Parts by weight |
|---|---|
| Epoxy resin component | 100 |
| Filler | 30–300 |
| Thermoplastic polymer | 3–30 |

Curing component-containing system.

|  | Parts by weight |
|---|---|
| Curing agent | 5–100 |
| Filler | 20–200 |
| Thermally decomposable blowing agent | 10–50 |

Thus, the new epoxy resin composition of the invention can be used widely for the temporary filling of spaces of structures or the temporary adhesion of aggregates. For example, the invention epoxy resin composition is valuable as putty for window glass use, packing of joints of metallic and plastic pipes, sealing agents of various kinds for sealing containers or for architectural and construction use, temporary covering and sealing agent of electric wires or cables, and bonding for other structure.

An important use of the invention epoxy resin composition resides in the sealing of electric wires or cables. Namely, if in joining electric wires or cables the core wires are first joined together, after which a sleeve is slipped over the joined portion of the core wires, then the sleeve and the sheath of the sealed are sealed by means of the invention epoxy resin composition and thereafter the epoxy resin composition is cured at a temperature lower than the decomposition temperature of the blowing agent to form the sealed portion, then when the need arises to dismantle the sealed portion, the epoxy resin composition seal can be easily broken up and removed by merely heating the sealed portion to a temperature above that at which the blowing agent decomposes and with the application of a relatively small force.

For removing the cured epoxy resin composition which fills the spaces of structures or which envelops aggregates, this can be accomplished by heating the structure or aggregate to a temperature above the decomposition temperature of the blowing agent contained in the cured resin composition, a temperature, say, from 80° to 300° C. Then the cured epoxy resin softens and expands on account of the decomposition of the blowing agent to set up numerous cracks in the interior of the epoxy resin composition, with the consequence that the cured resin composition can be broken by the application of a slight mechanical impacting or shearing force and hence be very easily removed.

The following nonlimitative examples are given for further illustration of the invention.

RECIPES I–XI

These recipes illustrate the preparation of the epoxy resin component-containing system used in the invention epoxy resin composition.

Intimate mixtures of plastic substances having the penetrations indicated in Table I, below were prepared by blending for 10–60 minutes at temperatures ranging between room temperature and 200° C, the epoxy resin components, metallic powders, fillers and thermoplastic polymers of the kinds and in the amounts indicated in Table I, below.

TABLE I

| Recipe | I | II | III | IV | V | VI | VII | VIII | IX | X | XI |
|---|---|---|---|---|---|---|---|---|---|---|---|
| Epoxy resin component: | | | | | | | | | | | |
| Araldite CY-248 (epoxy resin produced by Ciba Co.) | 100 | | | 100 | | 100 | | | | | |
| Araldite CY-235 (epoxy resin produced by Ciba Co.) | | | | | | | | 100 | | | |
| Epikote 828 (epoxy resin produced by Shell Chemical Co.) | | 100 | 100 | | | | | | 100 | 100 | 100 |
| Epikote 815 (epoxy resin produced by Shell Chemical Co.) | | | | | | | | | | 100 | |
| Epikote 832 (epoxy resin produced by Shell Chemical Co.) | | | | | 100 | | | | | | |
| Metallic powders: | | | | | | | | | | | |
| Al powder | | 100 | 100 | | 100 | 100 | | | 100 | | 50 |
| Fe₂O₃ powder | | | | 80 | | | 80 | | | 80 | |
| Filler: | | | | | | | | | | | |
| Talc | 100 | 60 | | | 100 | | | | 10 | 20 | 90 |
| Finely divided silica | | | | 10 | 10 | | | | 5 | | |
| Calcium carbonate | | | 80 | | | 80 | 50 | | | 20 | |
| Higher fatty acid-treated calcium carbonate | | | | 40 | | | 50 | | 45 | | |
| Soft clay | | 70 | 30 | | | 20 | | 70 | | 15 | |
| Hard clay | | 30 | | 60 | | | | 30 | | 10 | |
| Rock wool | 50 | | 100 | | 50 | | | | 65 | | 200 |
| Asbestos | 30 | | | | | 30 | 10 | | 20 | 15 | |
| Zinc white | | | | | | 40 | | 60 | 15 | 70 | |
| Thermoplastic polymer: | | | | | | | | | | | |
| Polystyrene granules | | | | | | 5 | | | 5 | | |
| Polystyrene powder | | | | | 20 | | 20 | | | 25 | |
| Ethylene-ethyl acrylate copolymer powder | | | | | | | 20 | | | | |
| Ethylene-vinyl acetate copolymer powder | | | | | | | | | | 20 | |
| Butyl rubber | | | | | | | | | | | |
| Penetration | 76 | 71 | 90 | 76 | 65 | 71 | 91 | 83 | 89 | 75 | 138 |

RECIPES XII–XXI

These recipes illustrate the preparation of the curing component-containing system which is to be used in combination with the epoxy resin component-containing systems of the foregoing recipes I–XI.

Intimate mixtures of plastic substances having the penetrations indicated in Table II, below, were prepared by blending for 10–60 minutes at room temperature the curing agents, fillers and blowing agents of the kinds in the amounts indicated in Table II, below.

polyethylene sleeve 6. The temperature of this resin composition reaches as high as 63° C. due to its autogenous heat, and

TABLE II

| Recipe | XII | XIII | XIV | XV | XVI | XVII | XVIII | XIX | XX | XXI |
|---|---|---|---|---|---|---|---|---|---|---|
| Curing agent: | | | | | | | | | | |
| Araldite HY 965 (curing agent produced by Ciba Co.) | 34 | | | 37 | 34 | | | | | |
| Araldite HY 966 (curing agent produced by Ciba Co.) | 6 | | | 3 | 6 | | | | | |
| Varsamid 140 (curing agent produced by General Mill Co.) | | | | | | 40 | | | | |
| Varsamid 125 (curing agent produced by General Mill Co.) | | | 40 | | | | | 40 | | |
| Tomide 225 (curing agent produced by Fuji Chemical Co.) | | | | | | | 25 | | 40 | |
| Tomide 245 (curing agent produced by Fuji Chemical Co.) | | 25 | | | | 25 | | | | 25 |
| Triethylenetetramine | | 20 | | | | 20 | | | | 20 |
| Tetraethylenepentamine | | 5 | | | | | 5 | | | |
| Thiocol LP-3 (curing agent produced by Thiocol Corp.) | | | | | | | | 5 | 10 | |
| Filler: | | | | | | | | | | |
| Talc | | | | | | | | | 40 | |
| Finely divided silica | 30 | 20 | 80 | | 30 | 10 | 80 | | 40 | |
| Calcium carbonate | | | | | | | | 5 | | |
| Higher fatty acid surface-treated calcium carbonate | 70 | | | 20 | | 20 | | 25 | | 50 |
| Soft clay | | | | 50 | | | | | 20 | |
| Hard clay | | | | 20 | 20 | | 15 | | | |
| Rock wool | | 20 | 50 | | | | 50 | | 10 | 70 |
| Asbestos | 30 | 90 | 80 | 40 | | 40 | | 50 | | |
| Zinc white | | 10 | | 20 | 10 | 10 | | 10 | | |
| Blowing agent: | | | | | | | | | | |
| Azoisobutyronitrile | | | | 50 | | 20 | | | 50 | |
| p-Toluenesulfonylhydrazide | | 20 | 15 | | | | 20 | 20 | 15 | |
| Azodicarbamic acid amide | 20 | | | 20 | | | | | | 20 |
| p,p'-Oxybis(benzenesulfonylhydrazide) | | | | | 25 | 25 | | | | |
| Penetration | 98 | 68 | 72 | 56 | 84 | 81 | 63 | 92 | 75 | 70 |

EXAMPLE 1

About equal volumes of the epoxy resin component-containing system of the foregoing Recipe I and the curing agent-containing system of the foregoing Recipe XII are mixed, and this plastic mixture is applied to an aluminum plate as a layer 80 mm. in thickness. This epoxy resin composition layer is cured by allowing it to stand at room temperature. The temperature of the resin composition reaches as high as 58° C. by its autogenous heat and as far as appearance is concerned the cure is completed in 130 minutes. This cured epoxy resin composition layer was observed to be intimately adhered to the aluminum plate.

The cured epoxy resin composition layer is heated for about 3 minutes by bringing the flame of a blowtorch in contact therewith. The epoxy resin layer is thus softened somewhat and is expanded, and the formation of numerous cracks in the layer is observed. The layer of epoxy resin can then be readily removed from the aluminum plate either by pounding with a hammer or scraping with a metallic rod.

EXAMPLE 2

This example illustrates the instance where the epoxy resin composition of the invention is used in joining communication cables. The attached drawing is a partial sectional view of the joint portion of a cable to which the invention epoxy resin composition has been applied. Referring to the figure in describing the joining method, core wires 3 of a paper-insulated Stalpeth sheath city cable of an outer diameter 70 mm. having a polyethylene sheath 1 enveloping a steel sheath 2 are first connected, after which a 4-mm.-thick polyethylene sleeve 6 having an outside diameter of 100 mm. is slipped over the joint portion. A polyethylene-aluminum laminated tape 4 is then wrapped about the polyethylene sheath 1 so that the aluminum side is on the outside and this is fused to the polyethylene sheath 1. This is followed by further wrapping a polychloroprene adhesive tape 8 about the polyethylene sheath 1 at intervals in the radius direction. An annular plate 5 of polystyrene foam is provided between the polyethylene sleeve 6 and the polyethylene sheath 1 so as to ensure the maintenance of the airtightness of the interior.

Next, the polyethylene-aluminum laminar tape 4 and the polychloroprene adhesive tape 8 are also wrapped about the polyethylene sleeve 6 in the same manner as in the case of the polyethylene sheath 1.

The epoxy resin component-containing system of the foregoing Recipe V and the curing agent-containing system of the foregoing Recipe XVI are mixed in about equal volumes, and the so obtained plastic mixture is applied as a layer 7 to the hereinbefore described polyethylene sheath 1 and the curing is apparently completed in 113 minutes. Thus the polyethylene sheath 1 of the cable and the polyethylene sleeve 6 are intimately joined.

A blowtorch flame is contacted with this cured epoxy resin composition layer 7 and heated for about 3 minutes. The cured epoxy resin layer 7 expands, and numerous cracks are observed to form therein. Since the resin layer 7 can be completely removed by inserting a metallic rod in the cracks and picking the resin layer, the polyethylene sleeve 6 can be moved in the axial direction after removal of the resin layer, and hence the joint portion of the core wires can be readily exposed.

EXAMPLES 3–16

The epoxy resin component-containing systems and the curing component-containing systems indicated in Table III below, wherein the constituents making up the systems had been mixed in the weight proportions indicated in the hereinbefore given respective recipes, are mixed in about equal volumes, following which the so obtained plastic blends are applied to aluminum plates as in example 1 and then cured by allowing to stand at room temperature.

The maximum temperatures that are reached during the curing of these resin compositions and the curing time are shown in Table III.

TABLE III

| Example | Epoxy resin component-containing system | Curing component-containing system | Maximum curing temperature (° C.) | Curing time (min.) |
|---|---|---|---|---|
| 3 | Recipe II | Recipe XIII | 63 | 110 |
| 4 | Recipe III | Recipe XIV | 53 | 148 |
| 5 | Recipe I | Recipe XIV | 57 | 140 |
| 6 | Recipe II | Recipe XIV | 58 | 135 |
| 7 | Recipe IV | Recipe XV | 60 | 130 |
| 8 | Recipe VI | Recipe XVI | 50 | 160 |
| 9 | Recipe VII | Recipe XV | 56 | 140 |
| 10 | Recipe VIII | Recipe XVII | 62 | 110 |
| 11 | Recipe IX | Recipe XX | 70 | 105 |
| 12 | Recipe X | Recipe XIX | 67 | 105 |
| 13 | Recipe VIII | Recipe XVIII | 60 | 120 |
| 14 | Recipe IX | Recipe XXI | 60 | 127 |
| 15 | Recipe IV | Recipe XVI | 53 | 148 |
| 16 | Recipe XI | Recipe XVII | 64 | 119 |

It can be seen that the cured layers of these epoxy resin compositions are intimately adhered to the aluminum plates. When these cured epoxy resin composition layers are heated for 1–5 minutes at 100–300° C., the layers of the cured resin compositions soften and expand and it was observed that numerous cracks were formed therein. When this was pounded with a hammer or a metallic rod was inserted in the cracks and the resin layer was picked, it was easily removed from the aluminum plate.

We claim:

1. A method of joining cables with a heat decomposable seal which comprises physically joining said cables and applying an epoxy resin composition to the abutting portion of said cables, said composition consisting essentially of:
 a. an epoxy resin component,
 b. a curing agent for said epoxy resin component,
 c. a solid, thermally decomposable blowing agent which is decomposable at a temperature higher than the curing agent of said epoxy resin composition,
thereafter curing said epoxy resin composition at a temperature lower than the decomposition temperature of said blowing agent, whereby said cured resin composition provides a more firmly joined cable.

2. A method of joining cables according to claim 1 wherein
 a. the cables to be joined are sheathed,
 b. the core wires of said sheathed cables are physically joined,
 c. a sleeve is slipped over said physically joined portion of the core wires so that the sleeve and sheath abut,
 d. the resin composition is applied to the area in which said sleeve and sheath abut whereby said sleeve and sheath are more firmly joined.

3. A process according to claim 1, wherein the epoxy resin component is a compound of the formula

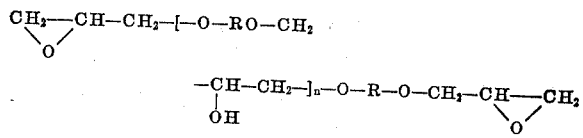

wherein R is a bivalent hydrocarbon group and $n$ is a number from 0 to 8.

4. A process according to claim 3, wherein $n$ is 0, 1 or 2.

5. A process according to claim 1, wherein the epoxy resin component is a condensation product of epichlorohydrin and an aromatic polyhydric alcohol or a polyhydric phenol.

6. A process according to claim 1, wherein the curing agent is a diamine, a polyamine, a polyamide resin of relatively low molecular weight, a polysulfide, or a mixture of two or more such compounds.

7. A process according to claim 1, wherein 5–100 parts by weight of the curing agent are used per 100 parts by weight of the epoxy resin component.

8. A process according to claim 7, wherein 30–60 parts of the curing agent are used.

9. A process according to claim 1, wherein the blowing agent is a solid blowing agent having a decomposition temperature of 90°–200° C.

10. A process according to claim 1, wherein the blowing agent is selected from the group consisting of azoisobutyronitrile, dinitrosopentamethylene tetramine, azodicarbamic acid amide, benzenesulphonyl hydrazide, p,p'-oxybis(benzenesulphonyl hydrazide), and N,N'-dinitroso-N,N'-dimethylterephthalamide.

11. A process according to claim 1, wherein 10–50 parts by weight of the blowing agent are used per 100 parts by weight of the epoxy resin component.

12. A process according to claim 10, wherein 15–25 parts of the blowing agent are used.

13. A process according to claim 1, wherein said epoxy resin component includes a thermoplastic polymer in admixture therewith.

14. A process according to claim 13, wherein the thermoplastic polymer is a homopolymer or copolymer of one or more alpha-beta-unsaturated compounds.

15. A process according to claim 13, which contains 3–30 parts by weight of the thermoplastic polymer per 100 parts by weight of the epoxy resin component.